United States Patent
Montero et al.

(10) Patent No.: US 11,914,524 B2
(45) Date of Patent: Feb. 27, 2024

(54) LATENCY MANAGEMENT IN SYNCHRONIZATION EVENTS

(71) Applicant: QUALCOMM Incorporated, San Diego, CA (US)

(72) Inventors: Adrian Montero, Austin, TX (US); Huzefa Sanjeliwala, Austin, TX (US); Paul Kitchin, Austin, TX (US); Prarthna Santhanakrishnan, Austin, TX (US); Conrado Blasco, San Mateo, CA (US); Pradeep Kanapathipillai, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 17/684,231

(22) Filed: Mar. 1, 2022

(65) Prior Publication Data

US 2023/0281133 A1 Sep. 7, 2023

(51) Int. Cl.
*G06F 12/1036* (2016.01)
*G06F 9/30* (2018.01)
*G06F 9/455* (2018.01)

(52) U.S. Cl.
CPC ...... *G06F 12/1036* (2013.01); *G06F 9/30043* (2013.01); *G06F 9/30047* (2013.01);
(Continued)

(58) Field of Classification Search
CPC ............. G06F 12/1036; G06F 9/30043; G06F 9/30047; G06F 9/30087; G06F 9/45558; G06F 2009/45562
See application file for complete search history.

(56) References Cited

U.S. PATENT DOCUMENTS

| 6,542,984 B1 * | 4/2003 | Keller ................... G06F 9/3838 712/214 |
| 2007/0226795 A1 | 9/2007 | Conti et al. |

(Continued)

FOREIGN PATENT DOCUMENTS

| EP | 3757859 A2 | 12/2020 |
| EP | 3920029 A1 | 12/2021 |

(Continued)

OTHER PUBLICATIONS

International Search Report and Written Opinion for International Patent Application No. PCT/US2023/060472, dated May 4, 2023, 20 pages.

*Primary Examiner* — Francisco A Grullon
(74) *Attorney, Agent, or Firm* — QUALCOMM Incorporated

(57) ABSTRACT

An electronic device includes one or more processors for executing one or more virtual machines. In response to a request for initiating a synchronization event, a processor identifies a subset of speculative memory access requests in one or more memory access request queues. Automatically and in accordance with the identifying, the processor purges translations associated with the subset of speculative memory access requests. Subsequent to the purging, the processor initiates the synchronization event. In some implementations, memory access completion is forced in response to a context synchronization event that corresponds to a termination of a first application, a termination of a first virtual machine, or a system call for updating a system register. Alternatively, in some implementations, memory access completion is forced in an operating system level or an application level in response to a data synchronization event that is initiated on a hypervisor layer or a firmware layer.

19 Claims, 10 Drawing Sheets

(52) U.S. Cl.
CPC ...... *G06F 9/30087* (2013.01); *G06F 9/45558* (2013.01); *G06F 2009/45562* (2013.01)

(56) References Cited

U.S. PATENT DOCUMENTS

| | | | |
|---|---|---|---|
| 2017/0060579 A1* | 3/2017 | Vincent | G06F 9/30058 |
| 2019/0205244 A1 | 7/2019 | Smith | |
| 2020/0026629 A1* | 1/2020 | Koothapaakkam | G06F 11/261 |
| 2020/0159677 A1* | 5/2020 | Evans | G06F 12/1027 |
| 2021/0173651 A1* | 6/2021 | Mukherjee | G06F 9/4881 |

FOREIGN PATENT DOCUMENTS

| | | | | |
|---|---|---|---|---|
| WO | 2015061731 | A1 | 4/2015 | |
| WO | 2019002808 | A1 | 1/2019 | |
| WO | 2019140274 | A1 | 7/2019 | |
| WO | WO-2019140274 | A1 * | 7/2019 | G06F 21/12 |

\* cited by examiner

Ensuring the visibility of translation system register update

CPU{0}

| | | |
|---|---|---|
| MSR TTBR0_EL1, Xt ; | Change control bits in System registers | 608 |
| ISB          ; | ISB initiates purge handshake from REU | 610 |
| LD   Xy, ,[Xp]   ; | Long-Latency table-walk | 612 |

Ensuring speculative table walks are completed

CPU{0}

| | | |
|---|---|---|
| HVC | ; Hypervisor call from Guest OS | 648 |
| <Executing in EL2> | ; Hypervisor code | |
| DSB | ; LSU initiates purge handshake on DSB | 650 |
| <Executing in EL2> | ; Hypervisor code | 652 |
| ERET | | |

*800*

Receive a request for initiating a synchronization event 802

> Receive a barrier instruction configured to force memory access completion to initiate a context synchronization event, wherein the context synchronization event corresponds to a termination of a first application to initiate a second application, a termination of a first virtual machine to initiate a second virtual machine, or a system call for updating a system register 820

> Receive a barrier instruction configured to force memory access completion to initiate a data synchronization event for updating registers associated with a virtual machine implemented on the respective processor 822
>> The barrier instruction includes a Hypervisor call from a Guest operating system 824

In response to the request: 804

> Identify a subset of speculative memory access requests in one or more memory access request queues 806
>> each memory access request queue includes an ordered-sequence of memory access requests, and the subset of speculative memory access requests are queued in anticipation of one or more instructions received subsequent to the request 812
>>> Receive the request includes receiving a barrier instruction configured to force memory access completion 814
>>
>> In response to the request, abort address translations of the subset of speculative memory access requests, and complete the barrier instruction within a first number of clock cycles 816
>>
>> The translations associated with the subset of speculative memory access requests are configured to be completed within a second number of clock cycles, and the first number is less than the second number 818

Automatically, in accordance with the identifying, purge translations associated with the subset of speculative memory access requests 808

Initiate the synchronization event 810

Figure 8

LATENCY MANAGEMENT IN SYNCHRONIZATION EVENTS

TECHNICAL FIELD

This application relates generally to microprocessor technology including, but not limited to, methods, systems, and devices for managing memory access requests associated with one or more processors executing virtual machine(s).

BACKGROUND

Caching improves computer performance by keeping recently used or often used data items, such as references to physical addresses of often used data, in caches that are faster to access compared to physical memory stores. As new information is fetched from physical memory stores or caches, caches are updated to store the newly fetched information to reflect current and/or anticipated data needs. A computer system that hosts a one or more virtual machines, may store information related to functions or applications executed at each virtual machine in different caches across the computer system. Before a virtual machine is shut down, or before an application is closed on a virtual machine, the computer system has to complete all table walks of memory access queues and/or sample all system registers to collect application identifiers and virtual machine identifiers during address translation. Such long-latency table walks and register sampling operations delay shutting down the virtual machine and closing the application on the virtual machine. As such, it would be highly desirable to provide an electronic device or electronic system that manages memory access requests and associated address translations efficiently for one or more processors executing virtual machine(s).

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of some implementations are used to manage memory accesses that are queued during synchronization events of a processor system executing virtual machine(s). In each synchronization event, a processor orchestrates a handshaking process to identify speculative memory access requests and purge translations associated with the speculative memory access requests without stalling the synchronization event.

Specifically, in some implementations, outstanding translation requests associated with speculative memory access requests are marked with a flag (e.g., "purged, with null-response"). In response to each marked translation request, a corresponding translation process is terminated prematurely without filling any translation cache structure (e.g., a table lookaside buffer (TLB), table walk caches). Data extracted from any speculative memory access request associated with the translation process cannot be applied, e.g., by an instruction fetch module, a load/store module, or a prefetch engine of the processor. The processor skips long-latency table walks of translations associated with the speculative memory access requests without compromising performance of the synchronization event. System registers do not need to be sampled and copied across translation units. By these means, an efficient memory management solution is offered to manage memory access requests and associated address translations efficiently for one or more processors executing virtual machine(s), which also expedites the synchronization events effectively.

In some implementations, a method is employed for managing memory accesses at a respective processor of one or more processors that are configured to execute one or more virtual machines. The method includes receiving a request for initiating a synchronization event. The method further includes in response to the request: identifying a subset of speculative memory access requests in one or more memory access request queues; automatically, in accordance with the identifying, purging translations associated with the subset of speculative memory access requests; and initiating the synchronization event. In some implementations, each memory access request queue includes an ordered-sequence of memory access requests, and the subset of speculative memory access requests are queued in anticipation of one or more instructions received subsequent to the request.

In some implementations, the respective processor is associated with a translation cache, and initiating the synchronization event further includes for each speculative memory access request, terminating a corresponding memory access request to read from or write into a respective memory unit a respective data item, aborting filling the translation cache associated with the respective processor, and withholding the respective processor from using the respective data item. Further, in some implementations, the translation cache includes a TLB and a page table cache.

In some implementations, the method further includes receiving a barrier instruction configured to force memory access completion to initiate a context synchronization event. The context synchronization event corresponds to a termination of a first application to initiate a second application, a termination of a first virtual machine to initiate a second virtual machine, or a system call for updating a system register. Alternatively, in some implementations, the method further includes receiving a barrier instruction configured to force memory access completion to initiate a data synchronization event for updating registers associated with a virtual machine implemented on the respective processor.

In another aspect, an electronic device includes one or more processors configured to execute one or more virtual machines. A respective processor is configured to implement any of the above methods.

In another aspect, a non-transitory computer readable storage medium stores one or more programs configured for execution by a respective processor of one or more processors that are configured to execute one or more virtual machines. The one or more programs include instructions that when executed by the respective processor, cause the respective processor to implement any of the above methods.

In yet another aspect, an apparatus for managing memory accesses at a respective processor of one or more processors includes means for performing any of the above methods. The one or more processors are configured to execute one or more virtual machines.

BRIEF DESCRIPTION OF THE DRAWINGS

FIG. 8 is a flow diagram of a method for managing memory access, in accordance with some implementations.

Figure 1:
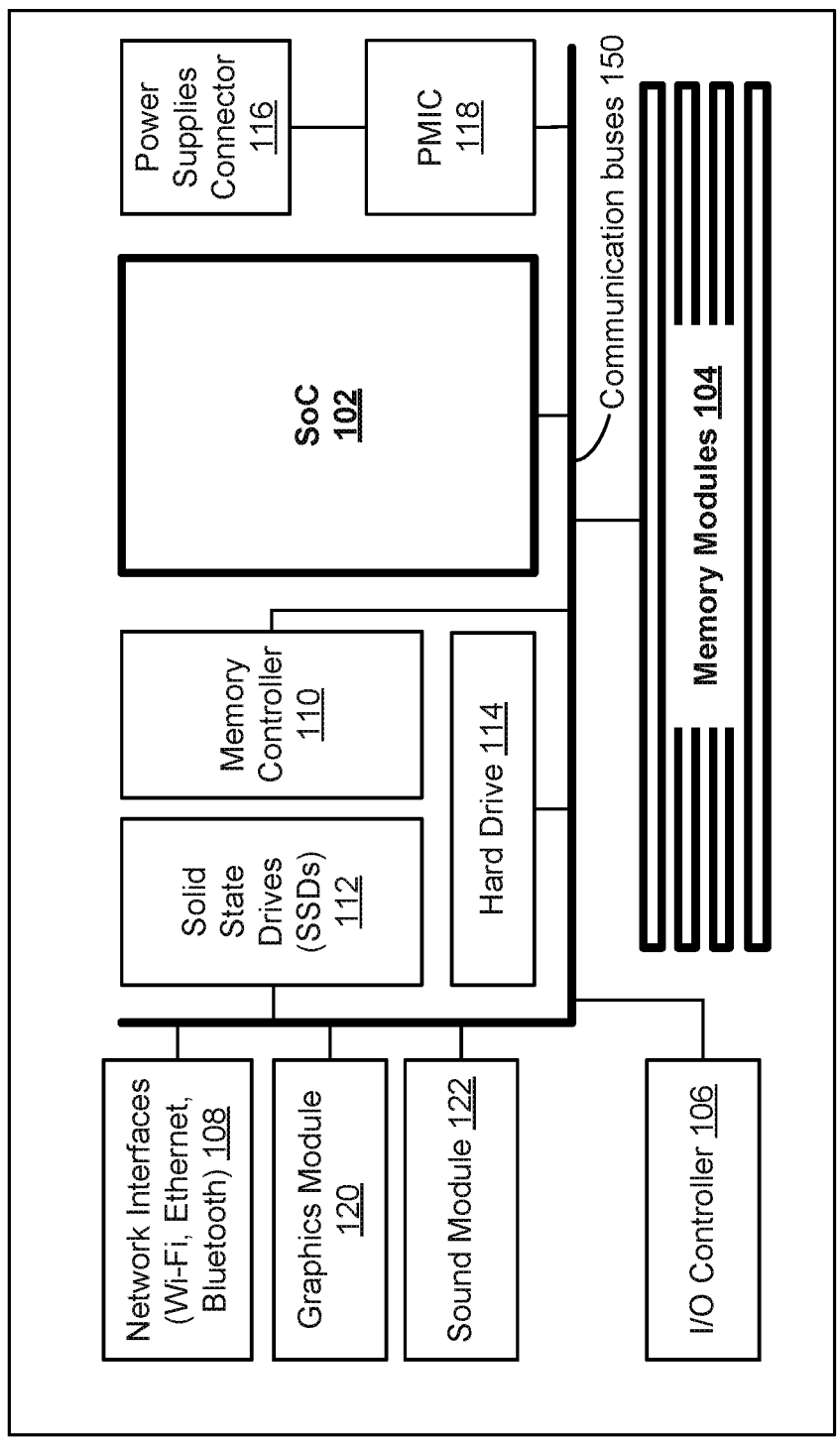
FIG. 1 is a block diagram of an example system module in a typical electronic device, in accordance with some implementations.

For a better understanding of the various described implementations, reference should be made to the Detailed Description below, in conjunction with the following drawings in which like reference numerals refer to corresponding parts throughout the figures. Like reference numerals refer to corresponding parts throughout the drawings.

DESCRIPTION OF IMPLEMENTATIONS

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details.

FIG. 1 is a block diagram of an example system module 100 in a typical electronic device in accordance with some implementations. The system module 100 in this electronic device includes at least a system on a chip (SoC) 102, memory modules 104 for storing programs, instructions and data, an input/output (I/O) controller 106, one or more communication interfaces such as network interfaces 108, and one or more communication buses 150 for interconnecting these components. In some implementations, the I/O controller 106 allows SoC 102 to communicate with an I/O device (e.g., a keyboard, a mouse or a track-pad) via a universal serial bus interface. In some implementations, the network interfaces 108 includes one or more interfaces for Wi-Fi, Ethernet and Bluetooth networks, each allowing the electronic device to exchange data with an external source, e.g., a server or another electronic device. In some implementations, the communication buses 150 include circuitry (sometimes called a chipset) that interconnects and controls communications among various system components included in the system module 100.

In some implementations, the memory modules 104 (e.g., memory 104 in FIG. 2) include high-speed random access memory, such as DRAM, SRAM, DDR RAM or other random access solid state memory devices. In some implementations, memory modules 104 include non-volatile memory, such as one or more magnetic disk storage devices, optical disk storage devices, flash memory devices, or other non-volatile solid state storage devices. In some implementations, the memory modules 104, or alternatively the non-volatile memory device(s) within the memory modules 104, include a non-transitory computer readable storage medium. In some implementations, memory slots are reserved on the system module 100 for receiving the memory modules 104. Once inserted into the memory slots, memory modules 104 are integrated into the system module 100.

In some implementations, the system module 100 further includes one or more components selected from:
- a memory controller 110 that controls communication between the SoC 102 and memory components, including the memory modules 104, in electronic device, including controlling memory management unit (MMU) line replacement (e.g., cache entry replacement, cache line replacement) in a cache in accordance with a cache replacement policy;
- solid state drives (SSDs) 112 that apply integrated circuit assemblies to store data in the electronic device, and in many implementations, are based on NAND or NOR memory configurations;
- a hard drive 114 that is a conventional data storage device used for storing and retrieving digital information based on electromechanical magnetic disks;
- a power supply connector 116 that is electrically coupled to receive an external power supply;
- power management integrated circuit (PMIC) 118 that modulates the received external power supply to other desired DC voltage levels, e.g., 5V, 3.3V or 1.8V, as required by various components or circuits (e.g., SoC 102) within electronic device;
- a graphics module 120 that generates a feed of output images to one or more display devices according to their desirable image/video formats; and
- a sound module 122 that facilitates the input and output of audio signals to and from the electronic device under control of computer programs.

It is noted that the communication buses 150 also interconnect and control communications among various system components including components 110-122.

Further, one skilled in the art knows that other non-transitory computer readable storage media can be used, as new data storage technologies are developed for storing information in the non-transitory computer readable storage media in the memory modules 104 and in the SSDs 112. These new non-transitory computer readable storage media include, but are not limited to, those manufactured from biological materials, nanowires, carbon nanotubes and individual molecules, even though the respective data storage technologies are currently under development and yet to be commercialized.

In some implementations, the SoC 102 is implemented on an integrated circuit that integrates one or more microprocessors or central processing units, memory, input/output ports and secondary storage on a single substrate. The SoC 102 is configured to receive one or more internal supply voltages provided by the PMIC 118. In some implementations, both the SoC 102 and the PMIC 118 are mounted on a main logic board, e.g., on two distinct areas of the main logic board, and electrically coupled to each other via conductive wires formed in the main logic board. As explained above, this arrangement introduces parasitic effects and electrical noise that could compromise performance of the SoC, e.g., cause a voltage drop at an internal voltage supply. Alternatively, in some implementations, the SoC 102 and the PMIC 118 are vertically arranged in an electronic device, such that they are electrically coupled to each other via electrical connections that are not formed in the main logic board. Such vertical arrangement of the SoC 102 and the PMIC 118 can reduce a length of electrical connections between the SoC 102 and the PMIC 118 and avoid performance degradation caused by the conductive wires of the main logic board. In some implementations, vertical arrangement of the SoC 102 and the PMIC 118 is facilitated in part by integration of thin film inductors in a limited space between the SoC 102 and the PMIC 118.

Figure 2:
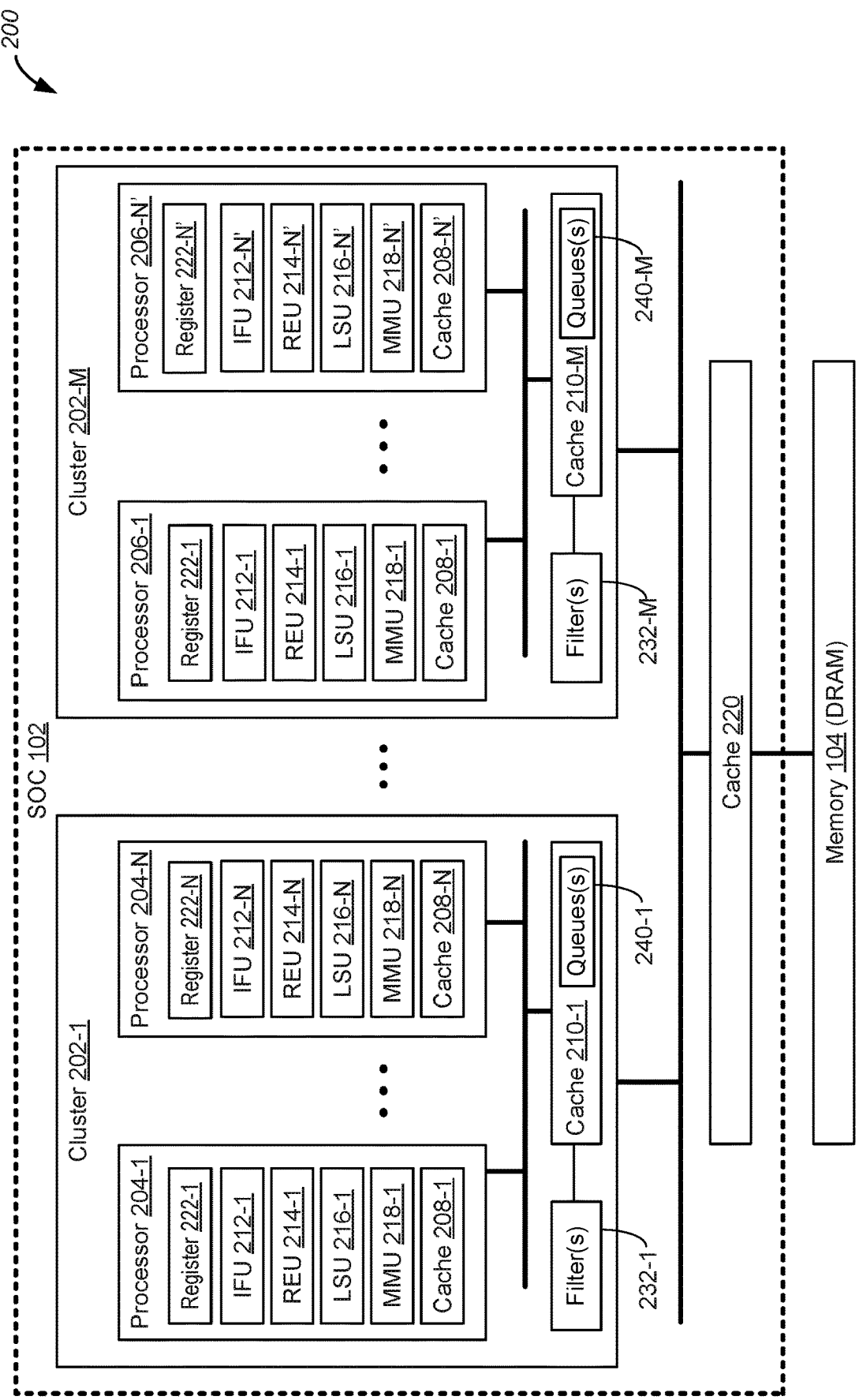
FIG. 2 is a block diagram of an example electronic device having one or more processing clusters, in accordance with some implementations.

FIG. 2 is a block diagram of an example electronic device 200 having one or more processing clusters 202 (e.g., first processing cluster 202-1, Mth processing cluster 202-M), in accordance with some implementations. In some implementations, the processing clusters 202 are implemented on one SoC 102. In some implementations, the processing clusters 202 are distributed across multiple SoCs. Electronic device 200 further includes a cache 220 and a memory 104 in addition to processing clusters 202. Cache 220 is coupled to processing clusters 202 on the electronic device 200, which is further coupled to memory 104 that is external to SoC 102. Each processing cluster 202 includes one or more processors 204 and a cluster cache 210. The cluster cache 210 is coupled to one or more processors 204, and optionally, maintains one or more request queues 240 for one or more processors 204. Each cluster cache 210 is also associated with one or more filters 232 that can be used to determine whether cache entries for a specific virtual machine, a specific address space, or a specific virtual address is stored in the associated cluster cache 210.

In some implementations, each processor 204 further includes a core cache 208 that is optionally split into an instruction cache and a data cache, and core cache 208 stores instructions and data that can be immediately executed by the respective processor 204. Each core cache 208 is also associated with one or more core filters (not shown in FIG. 2) that can be used to determine whether cache entries for a specific virtual machine, a specific address space, or a specific virtual address is stored in the associated core cache 208.

In an example, the first processing cluster 202-1 includes first processor 204-1, . . . , N-th processor 204-N, first cluster cache 210-1, where N is an integer greater than 1. The first cluster cache 210-1 has one or more first request queues 240-1, and each first request queues 240-1 includes a queue of demand requests and prefetch requests received from a subset of processors 204 of first processing cluster 202-1. Additionally, as new cache entries are stored at the first cluster cache 210-1, the one or more filter(s) 232-1 associated with the first cluster cache 210 are updated to store information regarding the newly added cache entries. For instance, if a new cache entry that includes a first virtual machine identifier (VMID) is stored at first cluster cache 210-1, the one or more filters 232-1 associated with the first cluster cache 210-1 is updated to store information indicating that the first cluster cache 210-1 stores at least one cache entry with the first VMID. However, as the first cluster cache 210-1 is updated with new cache entries, some cache entries may be evicted from the first cluster cache 210-1 such that the evicted cache entries are no longer stored at the first cluster cache 210-1. The one or more filters 232-1 associated with the first cluster cache 210-1 may continue to store information indicating that the first cluster cache 210-1 stores at least one cache entry with the first VMID even if cache entries that include the first VMID are no longer stored in the first cluster cache 210-1. The one or more filters 232-1 associated with the first cluster cache 210-1 must be regenerated to accurately reflect cache entries that are currently stored in the first cluster cache 210-1. For example, the one or more filters 232-1 associated with the first cluster cache 210-1 are updated in order to remove the information indicating that the first cluster cache 210-1 stores at least one cache entry with the first VMID.

In some implementations, the SoC 102 only includes a single processing cluster 202-1. Alternatively, in some implementations, the SoC 102 includes at least an additional processing cluster 202, e.g., M-th processing cluster 202-M. M-th processing cluster 202-M includes first processor 206-1, . . . , N'-th processor 206-N', and M-th cluster cache 210-M, where N' is an integer greater than 1 and M-th cluster cache 210-M has one or more M-th request queues 240-M.

In some implementations, the one or more processing clusters 202 are configured to provide a central processing unit for an electronic device and are associated with a hierarchy of caches. For example, the hierarchy of caches includes three levels that are distinguished based on their distinct operational speeds and sizes. For the purposes of this application, a reference to "the speed" of a memory (including a cache memory) relates to the time required to write data to or read data from the memory (e.g., a faster memory has shorter write and/or read times than a slower memory), and a reference to "the size" of a memory relates to the storage capacity of the memory (e.g., a smaller memory provides less storage space than a larger memory). The core cache 208, cluster cache 210, and cache 220 correspond to a first level (L1) cache, a second level (L2) cache, and a third level (L3) cache, respectively. Each core cache 208 holds instructions and data to be executed directly by a respective processor 204, and has the fastest operational speed and smallest size among the three levels of memory. For each processing cluster 202, the cluster cache 210 is slower operationally than the core cache 208 and bigger in size, and holds data that is more likely to be accessed by the processors 204 of respective processing cluster 202. The cache 220 is shared by the plurality of processing clusters 202, and bigger in size and slower in speed than each of the core cache 208 and the cluster cache 210. Each processing cluster 202 controls prefetches of instructions and data to the core caches 208 and/or the cluster cache 210. Each individual processor 204 further controls prefetches of instructions and data from a respective cluster cache 210 into a respective individual core cache 208.

In some implementations, a first cluster cache 210-1 of the first processing cluster 202-1 is coupled to a single processor 204-1 in the same processing cluster, and not to any other processors (e.g., 204-N). In some implementations, the first cluster cache 210-1 of the first processing cluster 202-1 is coupled to multiple processors 204-1 and 204-N in the same processing cluster. In some implementations, the first cluster cache 210-1 of the first processing cluster 202-1 is coupled to the one or more processors 204 in the same processing cluster 202-1, and not to processors in any cluster other than the first processing cluster 202-1 (e.g., processors 206 in cluster 202-M). The first cluster cache 210-1 of first processing cluster 202-1 is sometimes referred to as a second-level cache or an L2 cache.

In each processing cluster 202, each request queue 240 optionally includes a queue of demand requests and prefetch requests received from a subset of processors 204 of a respective processing cluster 202. Each data access request received from a respective processor 204 is distributed to one of the request queues 240 associated with the respective processing cluster 202. In some implementations, a request queue 240 receives only requests received from a specific processor 204. In some implementations, a request queue 240 receives requests from more than one processor 204 in the processing cluster 202, allowing a request load to be balanced among the plurality of request queues 240. Specifically, in some situations, a request queue 240 receives only one type of data retrieval requests (such as prefetch requests) from different processors 204 in the same processing cluster 202.

Each request queue 240 includes a plurality of memory access requests to access a memory system of an SOC 102 including core caches 208, cluster caches 210, cache 220, and memory 104. In some implementations, based on a type of requested information, each memory access request queue 240 includes one of a data translation queue, an instruction translation queue, and a prefetch translation queue. The data translation queue includes a plurality of data address mapping requests for translating virtual addresses associated with data, and the data is extracted from the memory system of the SoC 102 using the translated virtual addresses. The instruction translation queue includes a plurality of instruction address mapping requests for translating virtual addresses associated with instructions, and the instructions are extracted from the memory system of the SoC 102 using the translated virtual addresses. The prefetch translation queue is applied to fetch instruction opcodes from the memory system in advance, and includes a plurality of address mapping requests for translating virtual addresses associated with instruction opcodes. The instruction opcodes are extracted from the memory system of the SoC 102 using the translated virtual addresses in advance and will be processed by the processor(s) 204 in each processing cluster 202.

Each processing cluster 202 includes or is coupled to one or more IFUs 212 in the processors 204. The one or more IFUs 212 are configured to prefetch, decode, and/or prepare upcoming instructions in parallel with execution of current instructions. In some implementations, each processor 204 in the processing cluster 202 includes or is coupled to a respective IFU 212 to control cache fetching (including cache prefetching) associated with the respective processor 204. In some implementations, two or more of the processors 204 in the processing cluster 202 share the same IFU 212. A respective IFU 212 may include either of a demand fetcher for fetching instructions and associated data for demand requests and a prefetcher for fetching instructions and associated data for prefetch requests. In an example, the IFU 212 issues a data fetch request (which is optionally a demand request or a prefetch request) associated with an instruction, and the data fetch request is received at a processor 204 of a processing cluster 202. The data fetch request includes an address translation request that includes address information for translating a virtual address into a physical address and is applied to retrieve data from the memory 104. In response to the data fetch request, the processor 204 implements a virtual address to physical address translation or a virtual address to physical address mapping, which may, for example, identify a page entry in a page table. The related address translation request is queued in a data translation queue among the one or more memory access request queues 240.

In some implementations not shown in FIG. 2, each processor 204 includes a prefetch engine separately from the IFU 212. The prefetch engine is configured to implement prefetches in which upcoming instructions and associated data are fetched in advance while current instructions are implemented by the respective processor 204.

In some implementations, each processor 204 includes a rename/retire/dis-patch unit (REU) 214, a load/store unit (LSU) 216, and a memory management unit (MMU) 218. Alternatively, in some implementations, two or three processors 204 share a REU 214, a LSU 216, a MMU 218, or a subset thereof. The LSU 216 is configured to generate virtual addresses for loading and storage operations on data and instructions, load data from the memory 104 of the SoC 102, and store data from registers 222 to the memory 104 of the SoC 102. The REU 214 is configured for register renaming and instruction retirement and dispatching. The MMU 218 is configured to manage memory accesses based on the one or more memory access request queues 240. In some implementations, the MMU 218 collaborates with the LSU 216 or REU 214 to manage speculative memory accesses during synchronization events. The virtual addresses generated by the LSU 216 are associated with memory access requests in the one or more memory access request queues 240. In response to an initiation of a synchronization event (e.g., a context or data synchronization event), the REU 214 or LSU 216 generates a purge instruction to purge translations of speculative memory access requests in the one or more memory access request queues 240. In response to the purge instruction, the MMU 218 identifies the speculative memory access requests in the memory access request queue(s) 240 and purges address translations or mappings associated with the speculative memory access requests from the queue(s) 240.

Figure 3A:
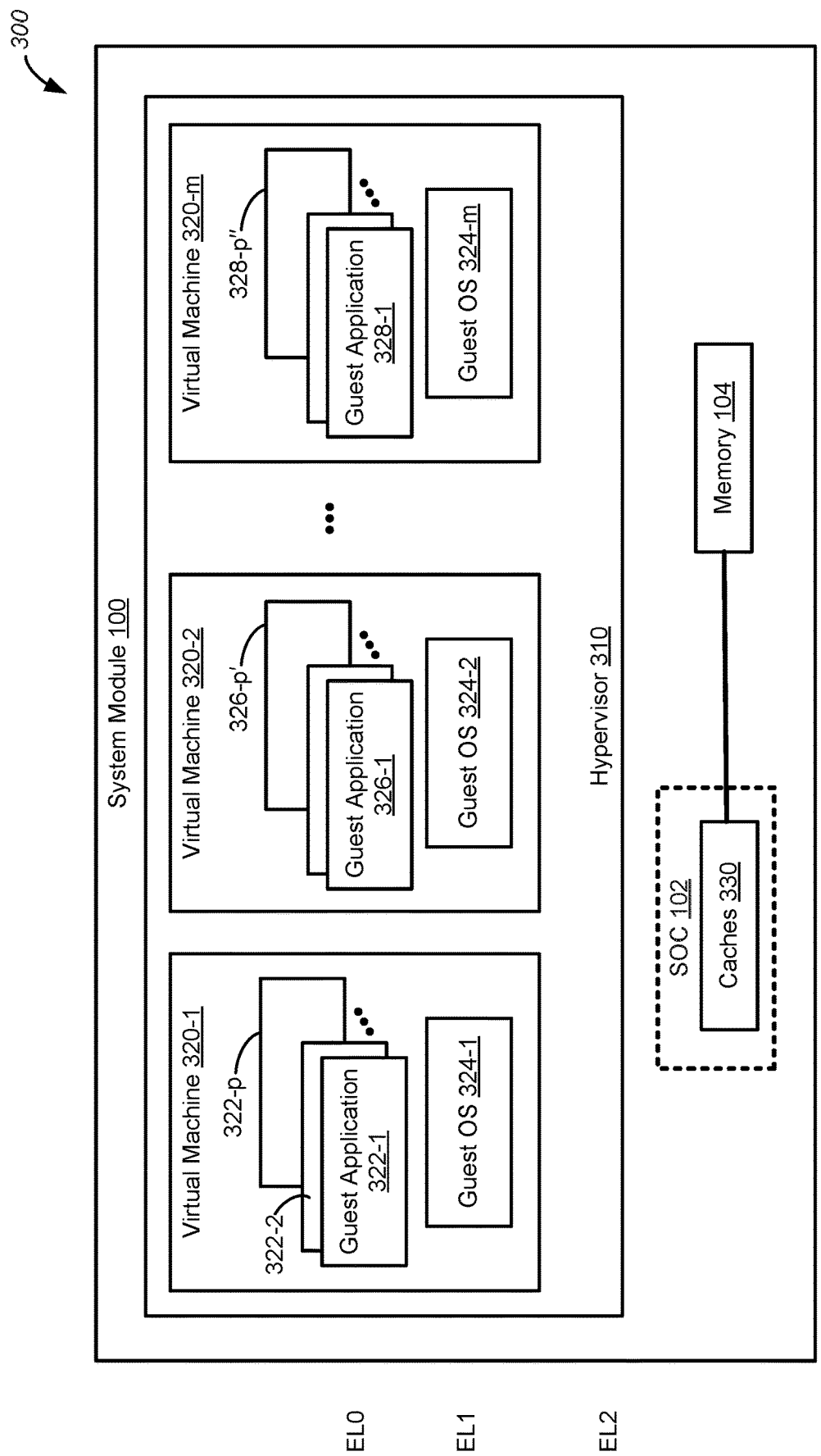
FIG. 3A is a block diagram of a hypervisor for hosting virtual machines on a system module, in accordance with some implementations.

FIG. 3A illustrates a block diagram of a hypervisor 310 for hosting virtual machines 320 on a system module 100, in accordance with some implementations. The system module 100 includes hardware supporting the hypervisor 310, such as the electronic device 200 and the memory 104. The electronic device 200 includes the caches 330 (which include caches 208, 212, and 220, shown in FIG. 2). The hypervisor 310 hosts one or more virtual machines 320 (e.g., virtual machines 320-1 through 320-$m$) and each of the virtual machines 320 runs a respective guest operating system (OS) 324 and one or more respective guest applications 322. For example, as shown in FIG. 3A, the hypervisor 310 hosts m number of virtual machines 320. A first virtual machine 320-1 runs a guest OS 324-1 as well as guest applications 322-1 through 322-$p$, and a second virtual machine 320-2 runs a guest OS 324-2 as well as guest applications 326-1 through 326-$p'$. Each of the virtual machines 320 operates independently from other virtual machines even though they are hosted by the same hypervisor 310. For example, the first virtual machine 320-1 and the second virtual machine 320-2 may be initiated or created at different times. In another example, the first virtual machine 320-1 may be shut down while the second virtual machine 320-2 remains operational. For instance, the first virtual machine 320-1 may be shut down without tearing down the second virtual machine 320-2. In yet another example, the first virtual machine 320-1 may open, run, or close any of the applications 322-1 through 322-$p$ independently of the second virtual machine 320-2 opening, running, or closing any of the applications 326-1 through 326-p'.

Although each of the virtual machines 320 operate independently of one another, information required to run each of the virtual machines 320, the respective guest OS 324, and the respective guest applications 322 is stored in memory 104. The virtual address to physical address translations that are used in running the virtual machines 320, the guest OS 324, and any guest applications 322 may be stored in the caches 330 of the system module 100. Thus, when a new virtual machine 320 is set up, or when a new application 322 is opened on a virtual machine 320, new address translations are stored as cache entries in the caches 330. Additionally, when a virtual machine 320 is shut down or an application 322 on a virtual machine 320 is closed, TLB invalidation instructions are sent to the caches 330 to invalidate cache entries associated with the shutdown virtual machine 320 or to invalidate cache entries associated with the guest application that has been closed on the virtual machine 320, respectively.

In a family of reduced instruction set computer (RISC) architectures for computer processors, e.g., Advanced RISC Machines (ARM), software is split into different modules, and each module has a respective level of access to the electronic device 200 including one or more processors 204, an associated caches 330, and memory 104. That said, Each software module has a distinct level of privilege (also called an exception level (EL)) that can only change when a processor 204 takes or returns from an exception. Each exception level is numbered, and the higher levels of privilege have higher numbers. For example, EL0, EL1, EL2, and EL3 correspond to increasing privilege levels of a guess application 322, guest OS 324, hypervisor 310, and firmware layer, respectively.

Figure 3B:
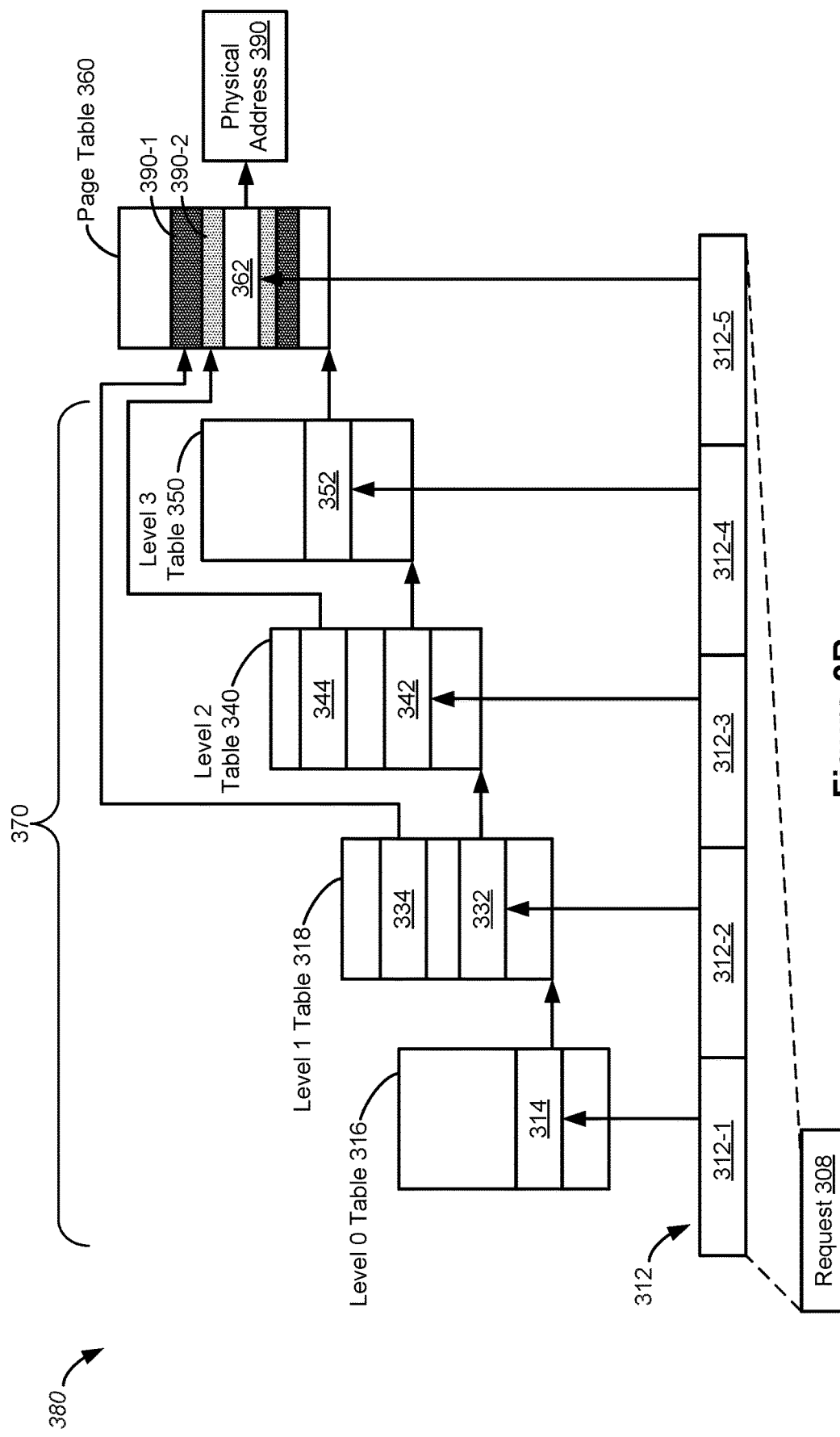
FIG. 3B is a flow diagram of a one-stage table walk process for fetching data by a processing cluster, in accordance with some implementations.

FIG. 3B is a flow diagram of a one-stage table walk process 380 for fetching data by a processing cluster 202 (e.g., by an IFU 212 of the first processing cluster 202-1 of FIG. 2), in accordance with some implementations. For each processing cluster 202, a memory access queue 240 includes an ordered sequence of memory access requests, and each memory access request includes an address translation request 308 that requests translation of a virtual address associated with a respective application 322 executed on a guest OS 324 of a virtual machine 320. The virtual address is translated to the physical address 390 in accordance with the one-stage table walk process 380. In this example, address translation information of each memory access request is stored in a multi-level hierarchy (i.e., the TLB 370) that includes at least one level 0 table, a plurality of level 1 tables, a plurality of level 2 tables, and a plurality of level 3 tables. A level 0 table stores page entries that include table descriptors that identify a specific level 1 table (e.g., a specific table of the plurality of level 1 tables, a first table of the plurality of level 1 tables), a level 1 table stores page entries that include table descriptors that identify a specific level 2 table (e.g., a specific table of the plurality of level 2 tables, a first table of the plurality of level 2 tables), a level 2 table stores page entries that include table descriptors that identify a specific level 3 table (e.g., a specific table of the plurality of level 3 tables, a first table of the plurality of level 3 tables), and a level 3 table stores page entries that include page descriptors that identify a specific page table 360 in memory 104. The table walk process 380 begins at the level 0 table and continues until the requested data 390 stored in the page entry in the memory 104 (e.g., the page table 360 in the memory 104) is identified.

A data fetch process begins with a processor (e.g., the processor 204-1) of a processing cluster (e.g., the processing cluster 202-1) receiving an address translation request 308 that includes a virtual address 312 to be translated. The virtual address 312 includes a translation table base register (TTBR), which identifies the level 0 table at which a data fetcher of the processor (e.g., the data fetcher 208-1 of the processor 204-1) can begin the table walk process 380. The table walk process 380 is initiated in accordance with a determination that requested data 390 (e.g., data requested by the address translation request 308) is not stored in the TLB 370 (e.g., a TLB "miss").

Specifically, the IFU 212 begins table walk process 380 by identifying a first table descriptor 314 that is stored in a page table entry in the level 0 table 316. The first table descriptor 314 includes information that identifies a level 1 table 318 (e.g., a specific level 1 table) for which the IFU 212 can query to continue the table walk process 380. In some implementations, at least a portion (e.g., a first portion 312-1) of virtual address 312 is used to find first table descriptor 314 in the level 0 table 316. For example, a first portion 312-1 of the virtual address 312 may include a reference to the page table entry in the level 0 table 316 that stores the first table descriptor 314.

The IFU 212 identifies the level 1 table 318 based on the first table descriptor 314 obtained (e.g., output) from level 0 table 316, and identifies a second table descriptor 332 that is stored in a page table entry in level 1 table 318. The second table descriptor 332 includes information that identifies a level 2 table 340 (e.g., a specific level 2 table) for which the IFU 212 can query to continue the table walk process 380. In some implementations, at least a portion (e.g., a second portion 312-2) of the virtual address 312 is used to find the second table descriptor 332 in the level 1 table 318. For example, a second portion 312-2 of the virtual address 312 may include a reference to the page table entry in level 1 table 318 that stores the second table descriptor 332. In some implementations, in addition to providing a second table descriptor 332, the level 1 table 318 also provides a first block descriptor 334 that identifies a first contiguous portion 390-1 within the memory 104, e.g., a first contiguous portion 390-1 in the memory 104 within which the requested data 390 is stored.

The IFU 212 identifies the level 2 table 340 based on a second table descriptor 332 obtained from the level 1 table 318, and identifies a third table descriptor 342 that is stored in a page table entry in the level 2 table 340. The third table descriptor 342 includes information that identifies a level 3 table 350 (e.g., a specific level 3 table) for which IFU 212 can query to continue the table walk process 380. In some implementations, at least a portion (e.g., a third portion 312-3) of the virtual address 312 is used to find the third table descriptor 342 in the level 2 table 340. For example, a third portion 312-3 of the virtual address 312 may include a reference to the page table entry in the level 2 table 340 that stores the third table descriptor 342. In some implementations, in addition to providing (e.g., outputting) the third table descriptor 342, the level 2 table 318 also provides a second block descriptor 344 that identifies a second contiguous portion 390-2 within the memory 104 (e.g., a second contiguous portion 390-2 in the memory 104 within which the requested data 390 (e.g., requested address translation) is stored). In some implementations, the second contiguous portion 390-2 in the memory 104 includes a smaller portion of memory 104 compared to the first contiguous portion 390-1 in the memory 104, and the first contiguous portion 390-1 in the memory 104 includes the second contiguous portion 390-2 in the memory 104. For example, the first contiguous portion 390-1 in the memory 104 includes 16 MB of space in the memory 104, and the second contiguous portion 390-2 in the memory 104 includes 32 KB of space in the memory.

The IFU 212 identifies the level 3 table 350 based on a third table descriptor 342 obtained (e.g., output) from the level 2 table 340, and identifies a page descriptor 352 that is stored in a page table entry in level 3 table 350. The page descriptor 352 includes information that identifies a page table 360 in memory 104 for which the IFU 212 can query to continue table walk process 380. In some implementations, at least a portion (e.g., a fourth portion 312-4) of the virtual address 312 is used to find the page descriptor 352 in the memory 104. For example, a fourth portion 312-4 of the virtual address 312 may include a reference to the page table entry in the level 3 table 350 that stores the page descriptor 352.

The IFU 212 queries the page table 360 in the memory 104, as identified by page descriptor 352 output from level 3 table 350, to find a page entry 362 that stores the requested data 390 (e.g., stores the requested virtual address to physical address translation). In some implementations, at least a portion (e.g., a fifth portion 312-5) of the virtual address 312 is used to find the page entry 362 in the page table 360. For example, a fifth portion 312-5 of the virtual address 312 may include a reference to the byte on the page table 360 that stores the requested data 390. Thus, using the table walk process 380, The IFU 212 of a processor (e.g., data fetcher 208-1 of processor 204-1) is able to obtain the requested data 390 (e.g., the requested address translation 380, the physical address 390 corresponding to the request 308) and pass the requested data 390 to the processor. However, the table walk process 380 introduces latency into system operations. Thus, in some embodiments, the table walk process 380 is skipped or bypassed for each speculative memory access request that is queued in a memory access request queue 240 in anticipation of one or more instructions received subsequent to a request for a synchronization event.

Figure 4:
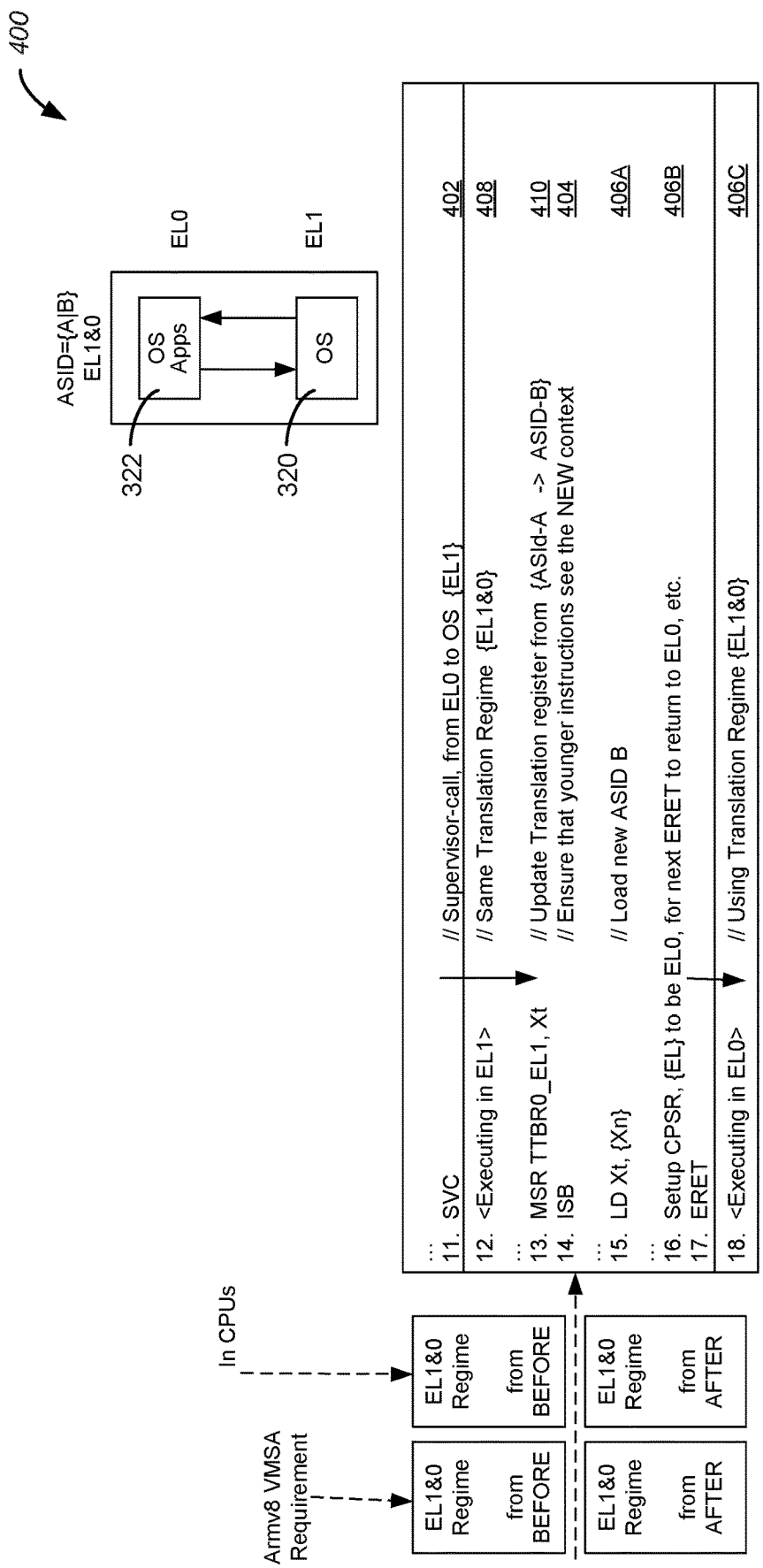
FIG. 4 is an example sequence of instructions implemented to enable a context synchronization event, in accordance with some implementations.

FIG. 4 is an example sequence of instructions 400 implemented to enable a context synchronization event, in accordance with some implementations. The context synchronization event corresponds to a termination of a first application 322-1 in a guest OS 324 to initiate a second application 322-2, a termination of a first virtual machine 320-1 to initiate a second virtual machine 320-2, or a system call for updating a system register 222. In some implementations, an instruction set architecture (ISA) is part of the hypervisor 310 of a system module 100 and defines how the processors 204 are controlled by software. At the context synchronization event, the ISA includes the set of instructions 400 configured to require translations and a consistent view of translation control system registers 222, e.g., for table walks of speculative memory access requests in a memory access queue 240. For example, a translation of a virtual address to a physical address retains the same address space identification (ASID) during the entire lifecycle of the translation.

In some implementations, an "SVC" request 402 for the context synchronization event includes a supervisor call from a first exception level EL0 to a second exception level ELL and is followed by an "ISB" barrier instruction 404 that is configured to force memory access completion to initiate the context synchronization event. The barrier instruction 404 creates an instruction synchronization barrier (ISB) that forces memory access ordering and access completion at a specific point. The barrier instruction 404 ensures that all instructions that come after the ISB instruction in program order are fetched from the cache or memory after the ISB instruction has completed. Using an ISB ensures that the effects of context-changing operations executed before the ISB are visible to the instructions fetched after the ISB instruction. In some implementations, context-changing operations require the insertion of an ISB instruction to ensure the effects of the operation are visible to instructions fetched after the ISB instruction. Examples of such context-changing operations include, but are not limited to, completed cache and TLB maintenance instructions and changes to system registers. Any context-changing operations appearing in program order after the ISB instruction 404 only take effect after the ISB has been executed.

For example, each memory access request queue 240 includes an ordered-sequence of memory access requests, and includes a subset of speculative memory access requests 406 that are queued in anticipation of one or more instructions received subsequent to the request 402. The speculative memory access requests 406 optionally include one or more prefetch instructions to load instructions 406A-406C or associated data to be processed subsequently to the context synchronization event. In some situations, these prefetch instructions are intended to fetch instructions and associated data for the second application 322 or second virtual machine 320 to which the context synchronization event is intended to initiate. As the caches 330 of the system module 100 have not been purged and reloaded based on the second application 322-2 or second virtual machine 320-2, the instructions and associated data, which are fetched due to the prefetch instructions, are outdated or inconsistent, and cannot be used to implement the second application 322-2 or second virtual machine 320-2.

Specifically, in response to the request 402 for the context synchronization event, the processor 204 identifies the subset of speculative memory access requests 406 and automatically purges address translations associated with the subset of speculative memory access requests 406. The context synchronization event is initiated, independently of whether the subset of speculative memory access requests 406 are purged. That said, the context synchronization event may be initiated after, while, or before the subset of speculative memory access requests 406 are purged. In some situations, the prefetch instructions are intended to fetch instructions and associated data for the second application 322 or second virtual machine 320, and speculative memory access requests 406 related to these prefetch instructions are purged. Given that these prefetch instructions provide the outdated instructions and data associated with the first application 322-1 or first virtual machine 320-1, purging the speculative memory access requests 406 related to these prefetch instructions enhances efficiency of memory accesses and expedites the context synchronization event.

Referring to FIG. 4, in an example, the request 402 for the context synchronization event includes a supervisor call for terminating a first application 322-1 and initiating a second application 322-2. The supervisor call is made from a first exception level EL0 to a second exception level ELL i.e., from the first application 322-1 to an operating system 324. The supervisor call is followed by a regime instruction 408 for maintaining a translation regime and a register update instruction 410 for updating a translation base register 222 from the first application 322-1 (e.g., ASID=A) to the second application 322-2 (e.g., ASID=B). The barrier instruction 404 is applied to create an instruction synchronization barrier (ISA) and ensure that new instructions received after the context synchronization event are processed in the context of the second application 322-2. The barrier instruction 404 is followed by an application load instruction 406A, an exception level instruction 406B, and a regime instruction 406C, which are associated with the second application 322-2.

In some situations, a plurality of speculative memory access requests 406 are queued in anticipation of the instructions 406A-406C. In response to the request 402, the processor 204 aborts implementation of address translations of the speculative memory access requests 406, while completing the barrier instruction 404 within a first number of clock cycles. In contrast, if the address translations of the speculative memory access requests 406 are not aborted, the address translations are configured to be completed within a second number of clock cycles. The first number is less than the second number. That said, purging translations associated with the subset of speculative memory access requests 406 expedites the context synchronization event by bypassing the speculative memory access requests 406 that might provide outdated or inconsistent instructions or data.

Figure 5:
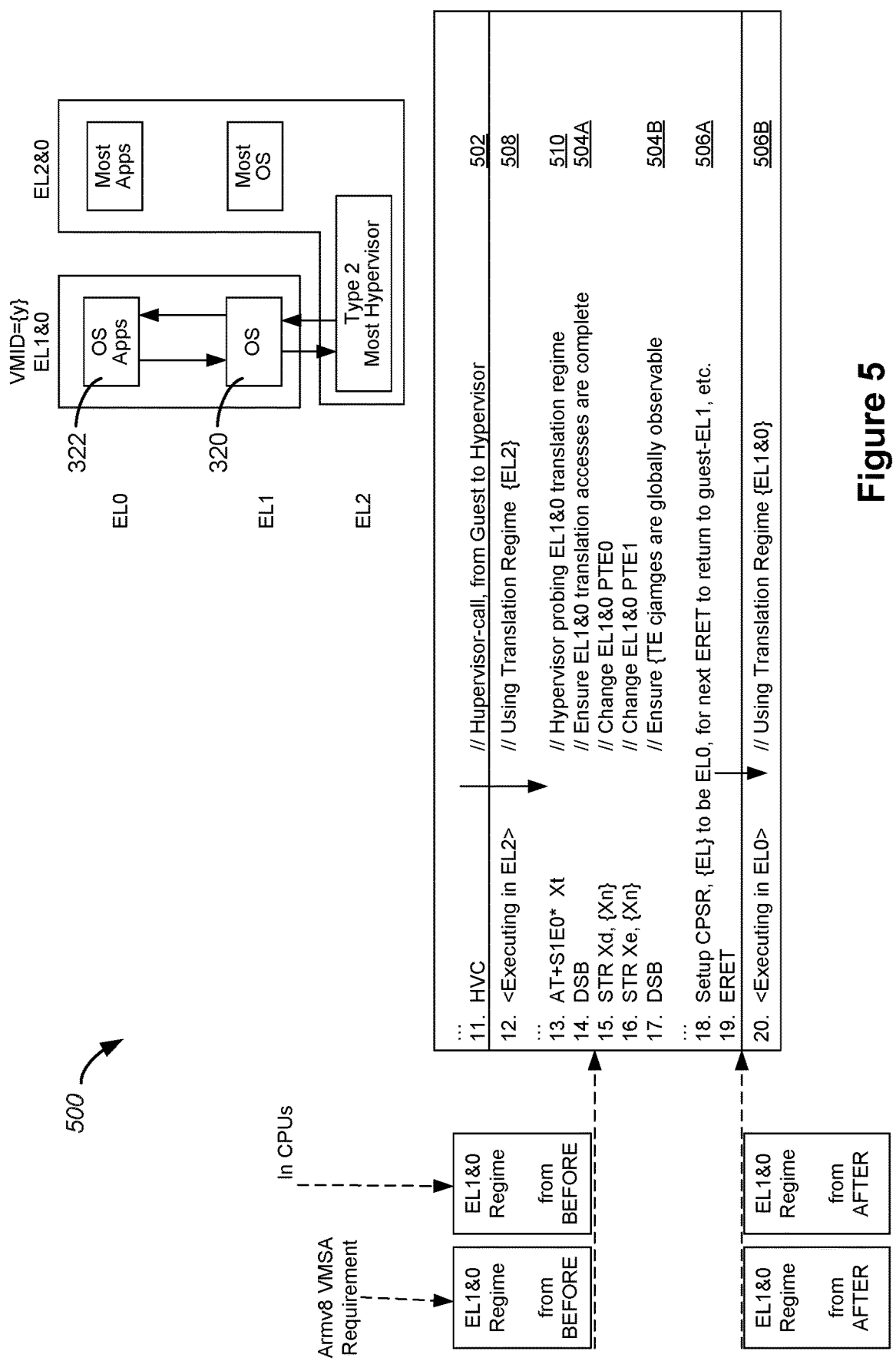
FIG. 5 is another example sequence of instructions 50 configured to enable a data synchronization event, in accordance with some implementations.

FIG. 5 is another example sequence of instructions 500 configured to enable a data synchronization event, in accordance with some implementations. A data synchronization event is implemented to permit a high exception level to be able to safely update translation control system register(s) 222 associated with a low exception level. For example, in the data synchronization event, a hypervisor 310 (EL2) updates associated translation control system registers 222 associated with a virtual machine 320, application 322. or operating system 324, e.g., when a context synchronization event occurs to switch between two virtual machines 320, two applications 322, or two operating systems 324, respectively. In some implementations, when the data synchronization event is executed from a hypervisor (EL2) or a firmware (EL3), and speculative address translations or table walks to lower exception levels (e.g., EL1 or EL0) are terminated. Address translations for one or more speculative memory accesses (i.e., speculative address translation or table walk) are purged, as the system registers 222 associated with translation control are updated.

In some implementations, an "HVC" request 502 is received via a hypervisor call to initiate the data synchronization event, and the hypervisor call is made from a guest application 322 or a guess operating system 324 to a hypervisor 310. The request 502 is followed by a barrier instruction 504 configured to force memory access completion to initiate a data synchronization event. The barrier instruction 504 includes one or more data synchronization barriers 504A and 504B that are executed on a hypervisor layer (EL2) or a firmware layer (EL3) to force memory access completion of the speculative memory access requests to an operating system level (EL1) or an application level (EL0). In an example, each barrier instruction includes a hypervisor call from a hypervisor 310 or a guest operating system 324. Specifically, each barrier instruction 504 creates a data synchronization barrier (DSB). The DSB blocks execution of any further instructions, not just loads or stores, until synchronization is complete. In some situations, the DSB also waits until all cache, TLB, and branch predictor maintenance operations that are issued by a processor 204 (e.g., speculative memory accesses) have completed. Conversely, in some implementations, the DSB purges any translations of any speculative memory accesses.

Each memory access request queue 240 includes an ordered-sequence of memory access requests, and includes a subset of speculative memory access requests 406 that are queued in anticipation of one or more instructions received subsequent to the request 502. In response to the request 502 for the data synchronization event, the processor 204 identifies a subset of speculative memory access requests 506 and automatically purges address translations associated with the subset of speculative memory access requests 406. The data synchronization event is initiated, before, after, or while the subset of speculative memory access requests 506 are purged. In some situations, prefetch instructions are issued to fetch instructions 506A-506B and associated data to be applied after the data synchronization event, and speculative memory access requests 506 related to these prefetch instructions are purged. These prefetch instructions provide the outdated instructions and data associated with caches, TLB, and memory that have not been updated, purging the speculative memory access requests 506 related to these prefetch instructions enhances efficiency of memory accesses and expedites the data synchronization event.

Referring to FIG. 5, in an example, the request 502 for the data synchronization event includes a hypervisor call from a guest (e.g., an operating system 324 or application 326) to a hypervisor 310. The hypervisor call is followed by a regime instruction 508 for maintaining a translation regime and a probing instruction 510 for probing the translation regime by the hypervisor 310. Two barrier instructions 504 are applied to create data barriers that ensure that address translations are completed and page table entries (PTEs) are updated and observable globally. The barrier instructions 504 are followed by an exception level instruction 506A and a regime instruction 506B. In some situations, a plurality of speculative memory access requests 506 are queued in anticipation of the instructions 506A-506B.

In some implementations, in response to the request 502, the processor 204 aborts implementation of address translations of the speculative memory access requests 506, while completing the barrier instruction 504 within a first number of clock cycles. In contrast, if the address translations of the speculative memory access requests 506 are not aborted, the address translations are configured to be completed within a second number of clock cycles. The first number is less than the second number. That said, purging translations associated with the subset of speculative memory access requests expedites the data synchronization event by bypassing the speculative memory access requests 506 that might provide outdated (e.g., inconsistent) instructions or data.

Figures 6A, 6B:
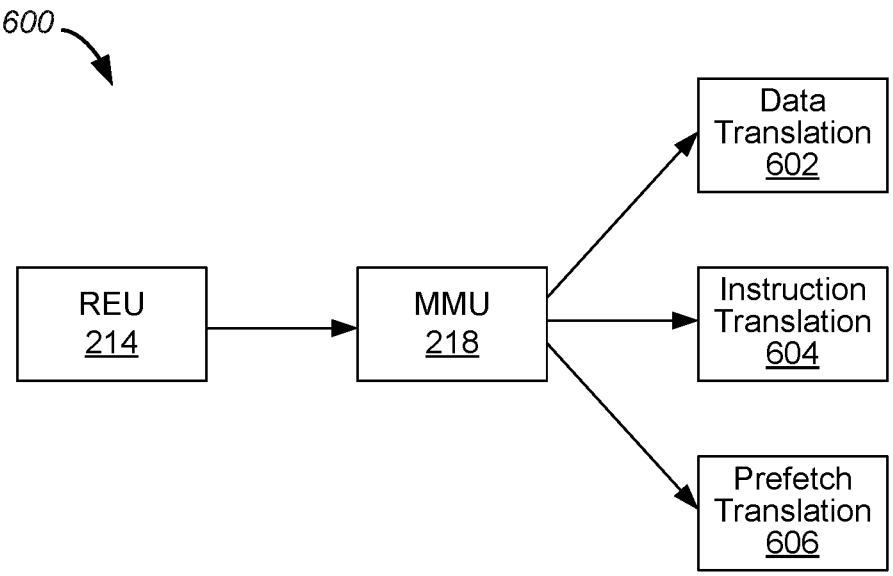
FIG. 6A is a flow diagram of an example address translation process implemented at a context synchronization event, in accordance with some implementations.
FIG. 6B is a sequence of example instructions configured to update system registers, in accordance with some implementations.

FIG. 6A is a flow diagram of an example address translation process 600 implemented at a context synchronization event, in accordance with some implementations, and FIG. 6B is a sequence of example instructions 620 configured to update system registers 222, in accordance with some implementations. Processors 204 of an SoC 102 orchestrate a synchronization event that purges address translations of speculative memory accesses (i.e., speculative address translations) without stalling completion of the synchronization event. Speculative memory accesses are marked, e.g., as "purged, with null-response", in a corresponding memory access queue 240 maintained in a cache 210. The address translations associated with the speculative memory access requests are automatically purged (i.e., terminated prematurely) in accordance with a determination that each speculative memory access request is marked. The processor 204 does not fill any translation caching structure (e.g., TLBs 370, page table 360). Data, if fetched by the speculative memory access requests, cannot be consumed by the IFU 212, REU 214, LSU 216, or MMU 218.

Specifically, an REU 214 and an MMU 218 of a processor 204 are coordinated with each other to complete the context synchronization event in which the speculative address translations are purged. Upon receiving a request for the context synchronization event, the REU 214 generates a barrier instruction for creating an ISB. In response to the barrier instruction, the REU 214 generates a purge instruction to purge translations of the subset of speculative memory access requests. The MMU 218 identifies the subset of speculative memory access requests in the memory access queue(s) 240 and purges the translations associated with the subset of speculative memory access requests. These purged translations includes data translations 602, instruction translations 604, prefetch translations 606, or a combination thereof. Alternatively, in some implementations, the one or more memory access request queues 240 include a data translation queue, an instruction translation queue, and a prefetch translation queue. The MMU 218 identifies the subset of speculative memory access requests in each of the data translation queue, instruction translation queue, and prefetch translation queue. The speculative memory access requests include at least one memory access request in the data, instruction, and prefetch translation queues, and an associated address translation is purged.

Referring to FIG. 6B, in an example, a request 608 for the context synchronization event is received by the REU 214. In response, the REU 214 starts a handshaking process by issuing the barrier instruction 610 that creates an ISB. Speculative address translation associated with a subsequent instruction 612 is purged to avoid a long latency table walk that might return an inconsistent or outdated instruction and associated data, which is not useable in subsequent processing.

Figures 6C, 6D:
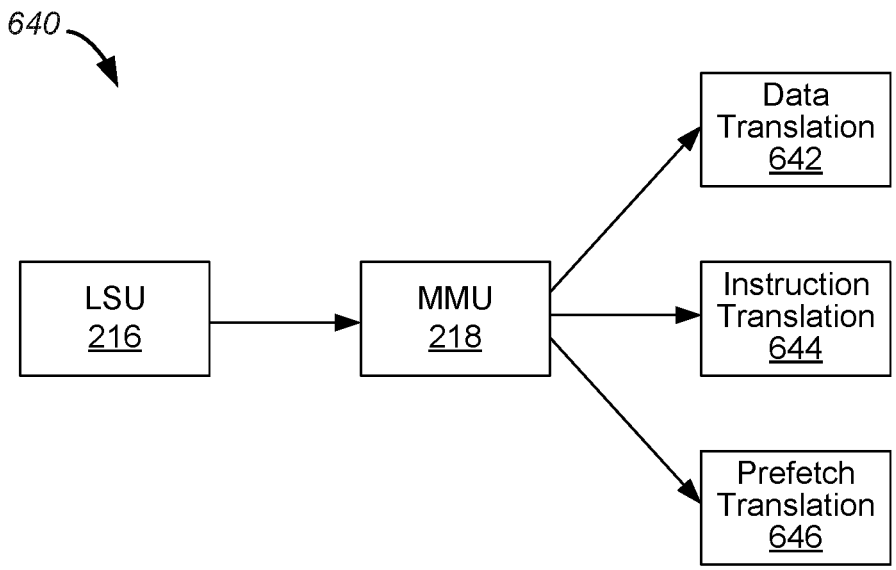
FIG. 6C is a flow diagram of another example address translation process implemented at a data synchronization event, in accordance with some implementations.
FIG. 6D is a sequence of example instructions configured to update system registers and complete table walks, in accordance with some implementations.

FIG. 6C is a flow diagram of another example address translation process 640 implemented at a data synchronization event, in accordance with some implementations, and FIG. 6D is a sequence of example instructions 660 configured to update system registers 222 and complete table walks, in accordance with some implementations. An LSU 216 and an MMU 218 of a processor 204 are coordinated with each other to complete the data synchronization event in which speculative address translations are purged. Upon receiving a request for the data synchronization event, the LSU 216 generates a barrier instruction for creating a DSB. In response to the barrier instruction, the LSU 216 generates a purge instruction to purge translations of a subset of speculative memory access requests. The MMU 218 identifies the subset of speculative memory access requests in the memory access queue(s) 240 and purges the translations associated with the subset of speculative memory access requests. These purged translations includes data translations 642, instruction translations 644, prefetch translations 646, or a combination thereof. Alternatively, in some implementations, the one or more memory access request queues 240 include a data translation queue, an instruction translation queue, and a prefetch translation queue. The MMU 218 identifies the subset of speculative memory access requests in each of the data translation queue, instruction translation queue, and prefetch translation queue. The speculative memory access requests include at least one memory access request in the data, instruction, and prefetch translation queues, and an associated address translation is purged.

Referring to FIG. 6D, in an example, a request 648 for the data synchronization event is received by the LSU 216. In response, the LSU 216 starts a handshaking process by issuing the barrier instruction 650 that creates the DSB. Speculative address translation associated with a subsequent instruction 652 is purged to avoid a long latency table walk that might return an inconsistent or outdated instruction and associated data, which is not useable in subsequent processing.

Figure 7:
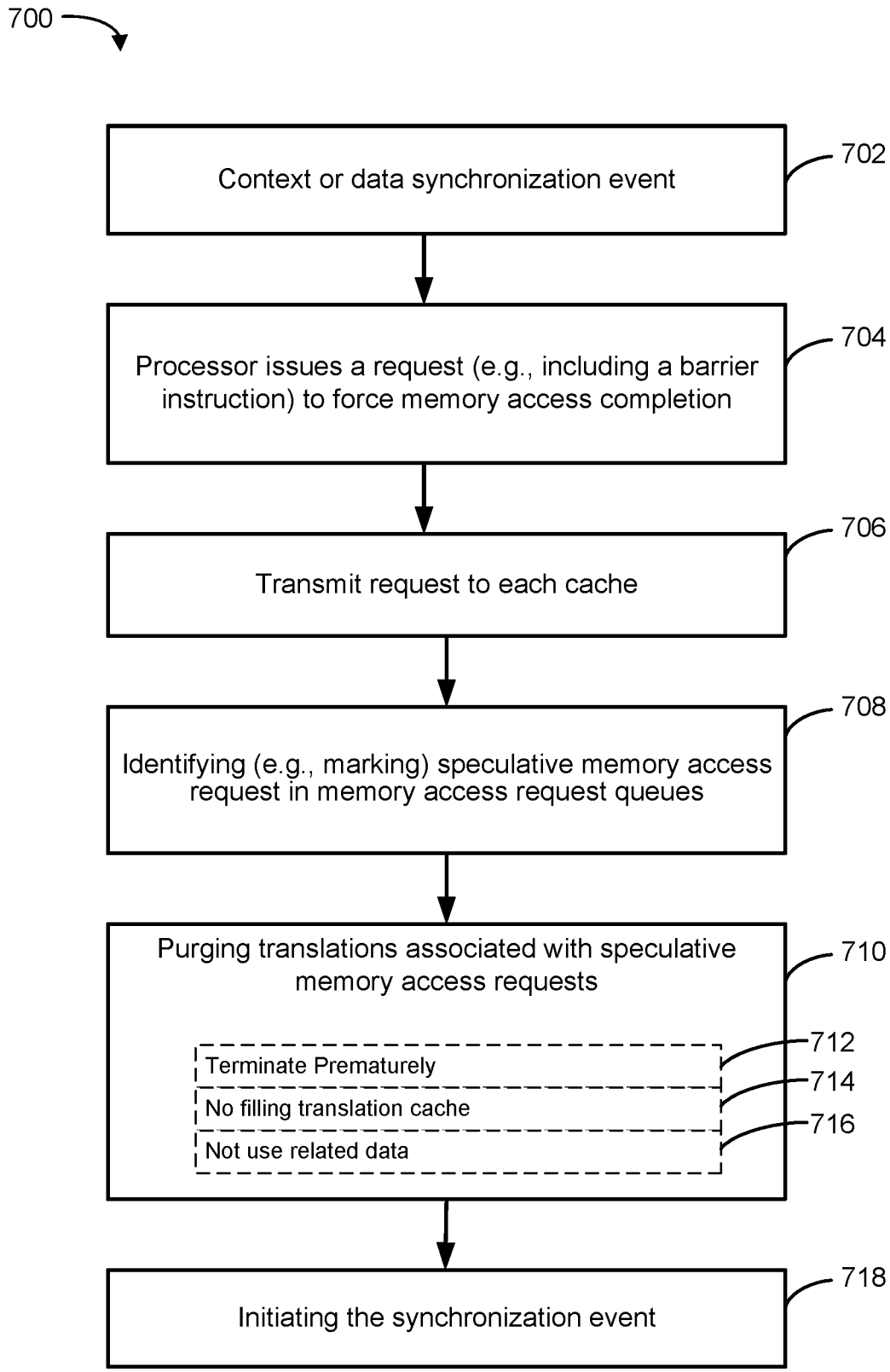
FIG. 7 is a flow diagram of a process for controlling a latency in a synchronization event, in accordance with some implementations.

FIG. 7 is a flow diagram of a process 700 for controlling a latency in a synchronization event, in accordance with some implementations. The process 700 is implemented by a processor 202 of a system module 100 having one or more processors 202 and a memory system. The memory system of the system module 100 includes a core cache 208 of each processor 202, a cluster cache 210 accessible to a plurality of processors 202 of a processing cluster 202, a cache 220 accessible to a plurality of processing clusters 202, and a memory 104 (e.g., a DRAM). Optionally, the cluster cache 210 stores one or more memory access queues 240 for the processors 202 coupled to the cluster cache 210. The process 700 expedites a synchronization event and reduces its latency by skipping translations of speculative memory accesses in the one or more memory access queues 240.

A processor 204 receives (702) a request 402 for a context synchronization event or a request 502 for a data synchronization event. In some implementations, the context synchronization event corresponds to an application ASID change (i.e., a termination of a first application 322-1 to initiate a second application 322-2), a virtual machine VMID change (i.e., a termination of a first virtual machine 320-1 to initiate a second virtual machine 320-2), or a system call for updating a system register 222. This context synchronization event is optionally triggered by one or more of: page table management, system calls, and exception return. Alternatively, in some implementations, the data synchronization event updates registers 222 associated with a virtual machine 320 implemented on the processor 204. In response to the request 402 or 502, the processor 204 issues (704) a request (e.g., including a barrier instruction) to force memory access completion. The request is transmitted (706) to each cache 208, 210, or 220. The processor 204 identifies (708) speculative memory access requests in the one or more memory access queues 240, e.g., marks each speculative memory access request with a flag. An example flag is "purged, with non-response". The processor 204 automatically purges (710) address translations associated with the speculative memory access requests in accordance with a determination that each speculative memory access request is marked. In some implementations, these address translations are terminated prematurely (712), and the processor 204 does not fill (714) any translation caching structure (e.g., TLBs, table walk caches). Data, if fetched by the speculative memory access requests, cannot be applied (716) by the IFU 212, REU 214, LSU 216, or MMU 218 of the same processor 204 or any other processor 204. The synchronization event may be initiated independently of purging of the translations, e.g., prior to, subsequently to, or concurrently with purging of the translations. Stated another way, in some situations, the synchronization event is initiated without waiting for initiation or completion of the translations.

The process 700 terminates speculative address translations at the time of the synchronization event, thereby allowing the synchronization event to be completed without being delayed by latencies caused by the speculative address translations. In an example, a synchronization event (e.g., ISB or DSB) completes in 10 clock cycles, and can be extended to more than 1000 clock cycles if long latency speculative address translations are not purged. During the course of purging the speculative address translations, system registers 222 do not need to be sampled and copied across translation units, and processing resources can be reserved to implement heavy operating system or hypervisor context switching, page table management, and system calls. By these means, skipping the speculative address translations enhances power consumption and performance of the SoC 102 at the time of the synchronization event.

It should be understood that the particular order in which the operations in FIG. 7 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to FIGS. 1-6D and 8 are also applicable in the process 700 in an exchangeable manner. For brevity, these details are not repeated here.

FIG. 8 is a flow diagram of a method 800 for managing memory access, in accordance with some implementations. Method 800 is implemented at a respective processor 204 of one or more processors 204 that are configured to execute one or more virtual machines 320. The one or more processors 204 are arranged into one or more processing clusters 202). The respective processor 204 (e.g., the first processor 204-1 of the first cluster 202-1) receives (802) a request for initiating a synchronization event. In response to the request (804), the respective processor 204 identifies (806) a subset of speculative memory access requests in one or more memory access request queues 240, and automatically, in accordance with the identifying, purges (808) translations associated with the subset of speculative memory access requests. The respective processor 204 initiates (810) the synchronization event. In some embodiments, the synchronization event is initiated (810) independently of purging of the translations (808), e.g., prior to, subsequently to, or concurrently with purging of the translations.

In some implementations, each memory access request queues 240 includes (812) an ordered sequence of memory access requests, and the subset of speculative memory access requests are queued in anticipation of one or more instructions received subsequent to the request. Further, in some implementations, receiving the request includes (814) receiving a barrier instruction configured to force memory access completion, In response to the request, the respective processor 204 aborts (816) address translations of the subset of speculative memory access requests, and completes the barrier instruction within a first number of clock cycles. The translations associated with the subset of speculative memory access requests are configured to be completed (818) within a second number of clock cycles, and the first number is less than the second number.

In some implementations, the respective processor 204 is associated with a translation cache and initiates the synchronization event by for each speculative memory access request, terminating a corresponding memory access request to read from or write into a respective memory unit a respective data item, aborting filling the translation cache associated with the respective processor, and withholding the respective processor from using the respective data item. Further, in some implementations, the translation cache includes a translation lookaside buffer (TLB) 370 and a page table cache 360. Additionally, in some implementations, the respective processor includes one of more of: an instruction fetch unit (IFU) 212 for fetching instructions and associated data from a first memory to a second memory faster than the first memory, a load/store unit (LSU) 216 for executing load and store instructions and generating virtual addresses, a rename/retire/dispatch unit (REU) 214 for register renaming and instruction retirement and dispatching, a memory management unit (MMU) 218 for managing memory access to caches and memory of the one or more processors, and a prefetch engine for fetching instructions or data from the first memory to the second memory in advance, and the IFU 212, LSU 216, REU 214, MMU 218, and prefetch engine of the respective processor are withheld from using the respective data item.

In some implementations, the respective processor 204 includes a memory management unit (MMU) 218 configured to manage the one or more memory access request queues 240. In response to the request, the respective processor 204 generates a purge instruction to purge translations of the subset of speculative memory access requests. The MMU 218 identifies the subset of speculative memory access requests in the one or more memory access queues and purges the translations associated with the subset of speculative memory access requests.

In some implementations, the subset of speculative memory access requests is identified by marking each of the subset of speculative memory access requests with a flag (e.g., "purged, with null-response"). The translations associated with the subset of speculative memory access requests are automatically purged in accordance with a determination that each speculative memory access request is associated with the flag.

In some implementations, the one or more memory access request queues 240 include a data translation queue, an instruction translation queue, and a prefetch translation queue, and the subset of speculative memory access requests include at least one memory access request in the data, instruction, and prefetch translation queues 240.

In some implementations, the respective processor 204 receives (820) a barrier instruction configured to force memory access completion to initiate a context synchronization event. The context synchronization event corresponds to a termination of a first application to initiate a second application, a termination of a first virtual machine to initiate a second virtual machine, or a system call for updating a system register 222.

Alternatively, in some implementations, the respective processor 204 receives (822) a barrier instruction configured to force memory access completion to initiate a data synchronization event for updating registers associated with a virtual machine implemented on the respective processor. The barrier instruction includes a data synchronization barrier that is executed on a hypervisor layer or a firmware layer to force memory access completion of the speculative memory access requests to an operating system level or an application level. Further, in some embodiments, the barrier instruction includes (824) a hypervisor call from a guest operating system.

It should be understood that the particular order in which the operations in FIG. 8 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to FIGS. 1-7 are also applicable in the method 800 in an exchangeable manner. For brevity, these details are not repeated here.

Implementation examples are described in at least the following numbered clauses:

Clause 1. A method for managing memory accesses, implemented at a respective processor of one or more processors that are configured to execute one or more virtual machines, the method comprising: receiving a request for initiating a synchronization event; in response to the request:

identifying a subset of speculative memory access requests in one or more memory access request queues; automatically, in accordance with the identifying, purging translations associated with the subset of speculative memory access requests; and initiating the synchronization event.

Clause 2. The method in clause 1, wherein each memory access request queue includes an ordered-sequence of memory access requests, and the subset of speculative memory access requests are queued in anticipation of one or more instructions received subsequent to the request.

Clause 3. The method of any of the preceding clause 2, further comprising: receiving the request includes receiving a barrier instruction configured to force memory access completion; and in response to the request, aborting address translations of the subset of speculative memory access requests, and completing the barrier instruction within a first number of clock cycles, wherein the translations associated with the subset of speculative memory access requests are configured to be completed within a second number of clock cycles, and the second number is less than the first number.

Clause 4. The method of any of clauses 1-3, wherein the respective processor is associated with a translation cache, and initiating the synchronization event further comprises for each speculative memory access request: terminating a corresponding memory access request to read from or write into a respective memory unit a respective data item; aborting filling the translation cache associated with the respective processor; and withholding the respective processor from using the respective data item.

Clause 5. The method of clause 4, wherein the translation cache includes a translation lookaside buffer (TLB) and a page table cache.

Clause 6. The method of clause 4 or 5, wherein the respective processor includes one of more of: an instruction fetch unit (IFU) for fetching instructions and associated data from a first memory to a second memory faster than the first memory, a load/store unit (LSU) for executing load and store instructions and generating virtual addresses, a rename/retire/dispatch unit (REU) for register renaming and instruction retirement and dispatching, a memory management unit (MMU) for managing memory access to caches and memory of the one or more processors, and a prefetch engine for fetching instructions or data from the first memory to the second memory in advance, and the IFU, LSU, REU, MMU, and prefetch engine of the respective processor are withheld from using the respective data item.

Clause 7. The method of any of the preceding clauses, wherein the respective processor includes a memory management unit (MMU) configured to manage the one or more memory access request queues, the method further comprising: in response to the request, generating by the respective processor a purge instruction to purge translations of the subset of speculative memory access requests, wherein the MMU identifies the subset of speculative memory access requests in the one or more memory access queues and purges the translations associated with the subset of speculative memory access requests.

Clause 8. The method of any of the preceding clauses, wherein: identifying the subset of speculative memory access requests includes marking each of the subset of speculative memory access requests with a flag, wherein the translations associated with the subset of speculative memory access requests are automatically purged in accordance with a determination that each speculative memory access request is associated with the flag.

Clause 9. The method of any of the preceding clauses, wherein the one or more memory access request queue include a data translation queue, an instruction translation queue, and a prefetch translation queue, and the subset of speculative memory access requests include at least one memory access request in the data, instruction, and prefetch translation queue.

Clause 10. The method of any of clauses 1-9, further comprising: receiving a barrier instruction configured to force memory access completion to initiate a context synchronization event; wherein the context synchronization event corresponds to a termination of a first application to initiate a second application, a termination of a first virtual machine to initiate a second virtual machine, or a system call for updating a system register.

Clause 11. The method of any of clauses 1-9, further comprising: receiving a barrier instruction configured to force memory access completion to initiate a data synchronization event for updating registers associated with a virtual machine implemented on the respective processor; wherein the barrier instruction includes a data synchronization barrier that is executed on a hypervisor layer or a firmware layer to force memory access completion of the speculative memory access requests to an operating system level or an application level.

Clause 12. The method of clause 11, wherein the barrier instruction includes a hypervisor call from a guest operating system.

Clause 13. An electronic device, comprising one or more processors configured to execute one or more virtual machines, wherein a respective processor is configured to implement a method in any of clauses 1-12.

Clause 14. A non-transitory computer readable storage medium, storing one or more programs configured for execution by a respective processor of one or more processors that are configured to execute one or more virtual machines, the one or more programs including instructions that when executed by the respective processor, cause the respective processor to implement a method in any of clauses 1-12.

Clause 15. An apparatus for managing memory accesses at a respective processor of one or more processors that are configured to execute one or more virtual machines, the apparatus comprises means for performing a method in any of clauses 1-12.

The above description has been provided with reference to specific implementations. However, the illustrative discussions above are not intended to be exhaustive or to be limiting to the precise forms disclosed. Many modifications and variations are possible in view of the above teachings. The implementations were chosen and described in order to best explain the principles disclosed and their practical applications, to thereby enable others to best utilize the disclosure and various implementations with various modifications as are suited to the particular use contemplated.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof

What is claimed is:

1. A method for managing memory accesses, implemented at a respective processor of one or more processors that are configured to execute one or more virtual machines, comprising:
   receiving a request for initiating a synchronization event; and
   in response to the request:
   identifying a subset of speculative memory access requests in one or more memory access request queues;
   automatically, in accordance with the identifying, purging translations associated with the subset of speculative memory access requests; and
   initiating the synchronization event,
   wherein the respective processor includes a memory management unit (MMU) configured to manage the one or more memory access request queues, the method further comprising:
   in response to the request, generating by the respective processor a purge instruction to purge translations of the subset of speculative memory access requests, wherein the MMU identifies the subset of speculative memory access requests in the one or more memory access queues and purges the translations associated with the subset of speculative memory access requests.

2. The method of claim 1, wherein each memory access request queue includes an ordered-sequence of memory access requests, and the subset of speculative memory access requests are queued in anticipation of one or more instructions received subsequent to the request.

3. The method of claim 2, further comprising:
   receiving the request includes receiving a barrier instruction configured to force memory access completion; and
   in response to the request, aborting address translations of the subset of speculative memory access requests, and completing the barrier instruction within a first number of clock cycles, wherein the translations associated with the subset of speculative memory access requests are configured to be completed within a second number of clock cycles, and the first number is less than the second number.

4. The method of claim 1, wherein, the respective processor is associated with a translation cache, and initiating the synchronization event further comprises for each speculative memory access request:
   terminating a corresponding memory access request to read from or write into a respective memory unit a respective data item;
   aborting filling the translation cache associated with the respective processor; and
   withholding the respective processor from using the respective data item.

5. The method of claim 4, wherein the translation cache includes a translation lookaside buffer (TLB) and a page table cache.

6. The method of claim 4, wherein:
   the respective processor includes one of more of: an instruction fetch unit (IFU) for fetching instructions and associated data from a first memory to a second memory faster than the first memory, a load/store unit (LSU) for executing load and store instructions and generating virtual addresses, a rename/retire/dispatch unit (REU) for register renaming and instruction retirement and dispatching, a memory management unit (MMU) for managing memory access to caches and memory of the one or more processors, and a prefetch engine for fetching instructions or data from the first memory to the second memory in advance; and
   the IFU, LSU, REU, MMU, and prefetch engine of the respective processor are withheld from using the respective data item.

7. The method of claim 1, wherein:
   identifying the subset of speculative memory access requests includes marking each of the subset of speculative memory access requests with a flag, wherein the translations associated with the subset of speculative memory access requests are automatically purged in accordance with a determination that each speculative memory access request is associated with the flag.

8. The method of claim 1, wherein the one or more memory access request queues include a data translation queue, an instruction translation queue, and a prefetch translation queue, and the subset of speculative memory access requests include at least one memory access request in the data, instruction, and prefetch translation queues.

9. The method of claim 1, further comprising:
   receiving a barrier instruction configured to force memory access completion to initiate a context synchronization event;
   wherein the context synchronization event corresponds to a termination of a first application to initiate a second application, a termination of a first virtual machine to initiate a second virtual machine, or a system call for updating a system register.

10. The method of claim 1, further comprising:
receiving a barrier instruction configured to force memory access completion to initiate a data synchronization event for updating registers associated with a virtual machine implemented on the respective processor;
wherein the barrier instruction includes a data synchronization barrier that is executed on a hypervisor layer or a firmware layer to force memory access completion of the speculative memory access requests to an operating system level or an application level.

11. The method of claim 10, wherein the barrier instruction includes a hypervisor call from a guest operating system.

12. An electronic device, comprising one or more processors configured to execute one or more virtual machines, wherein a respective processor is configured to perform:
receiving a request for initiating a synchronization event; and
in response to the request:
identifying a subset of speculative memory access requests in one or more memory access request queues;
automatically, in accordance with the identifying, purging translations associated with the subset of speculative memory access requests; and
initiating the synchronization event,
wherein the respective processor includes a memory management unit (MMU) configured to manage the one or more memory access request queues, and is configured to:
in response to the request, generating by the respective processor a purge instruction to purge translations of the subset of speculative memory access requests, wherein the MMU identifies the subset of speculative memory access requests in the one or more memory access queues and purges the translations associated with the subset of speculative memory access requests.

13. The electronic device of claim 12, wherein each memory access request queue includes an ordered-sequence of memory access requests, and the subset of speculative memory access requests are queued in anticipation of one or more instructions received subsequent to the request.

14. The electronic device of claim 13, wherein the respective processor is further configured to perform:
receiving the request includes receiving a barrier instruction configured to force memory access completion; and
in response to the request, aborting address translations of the subset of speculative memory access requests, and completing the barrier instruction within a first number of clock cycles, wherein the translations associated with the subset of speculative memory access requests are configured to be completed within a second number of clock cycles, and the first number is less than the second number.

15. The electronic device of claim 12, wherein the respective processor is associated with a translation cache, and initiating the synchronization event further comprises for each speculative memory access request:
terminating a corresponding memory access request to read from or write into a respective memory unit a respective data item;
aborting filling the translation cache associated with the respective processor; and
withholding the respective processor from using the respective data item.

16. The electronic device of claim 15, wherein the translation cache includes a translation lookaside buffer (TLB) and a page table cache.

17. The electronic device of claim 16, wherein the respective processor includes one of more of: an instruction fetch unit (IFU) for fetching instructions and associated data from a first memory to a second memory faster than the first memory, a load/store unit (LSU) for executing load and store instructions and generating virtual addresses, a rename/retire/dis-patch unit (REU) for register renaming and instruction retirement and dispatching, and a prefetch engine for fetching instructions or data from the first memory to the second memory in advance, and the IFU, LSU, REU, MMU, and prefetch engine of the respective processor are withheld from using the respective data item.

18. A non-transitory computer readable storage medium, storing one or more programs configured for execution by a respective processor of one or more processors that are configured to execute one or more virtual machines, the one or more programs including instructions that when executed by the respective processor, cause the respective processor to perform:
receiving a request for initiating a synchronization event; and
in response to the request:
identifying a subset of speculative memory access requests in one or more memory access request queues;
automatically, in accordance with the identifying, purging translations associated with the subset of speculative memory access requests;
initiating the synchronization event; and
receiving a barrier instruction configured to force memory access completion to initiate a data synchronization event for updating registers associated with a virtual machine implemented on the respective processor,
wherein the barrier instruction includes a data synchronization barrier that is executed on a hypervisor layer or a firmware layer to force memory access completion of the speculative memory access requests to an operating system level or an application level.

19. An apparatus for managing memory accesses at a respective processor of one or more processors that are configured to execute one or more virtual machines, the apparatus comprises:
means for receiving a request for initiating a synchronization event; and
means for in response to the request:
identifying a subset of speculative memory access requests in one or more memory access request queues;
automatically, in accordance with the identifying, purging translations associated with the subset of speculative memory access requests;
subsequent to the purging, initiating the synchronization event; and
means for receiving a barrier instruction configured to force memory access completion to initiate a data synchronization event for updating registers associated with a virtual machine implemented on the respective processor,
wherein the barrier instruction includes a data synchronization barrier that is executed on a hypervisor layer or a firmware layer to force memory access completion of the speculative memory access requests to an operating system level or an application level.

\* \* \* \* \*